Feb. 7, 1939.  S. INGILDSEN  2,146,120
AUTOMOBILE RADIATOR CONSTRUCTION
Filed April 20, 1936   3 Sheets-Sheet 1

INVENTOR.
Sven Ingildsen.
BY
Dike, Calver & Gray
ATTORNEYS.

Feb. 7, 1939.   S. INGILDSEN   2,146,120
AUTOMOBILE RADIATOR CONSTRUCTION
Filed April 20, 1936   3 Sheets-Sheet 2
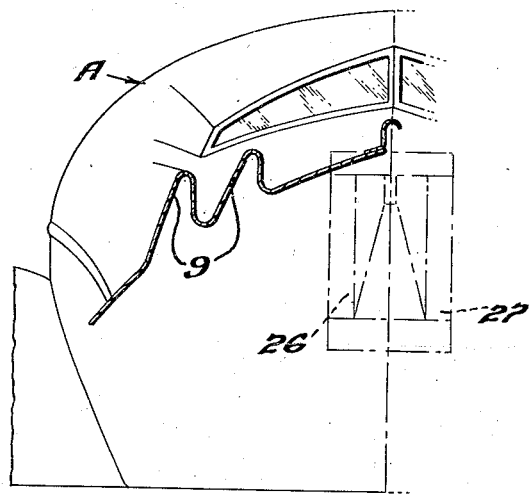
Fig. 3.
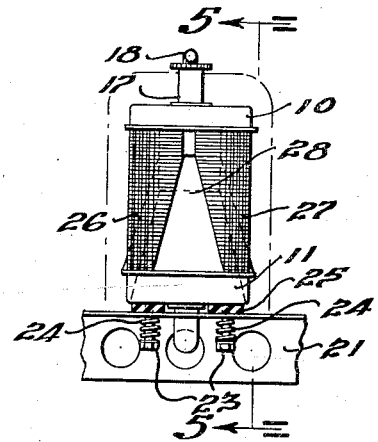
Fig. 4.
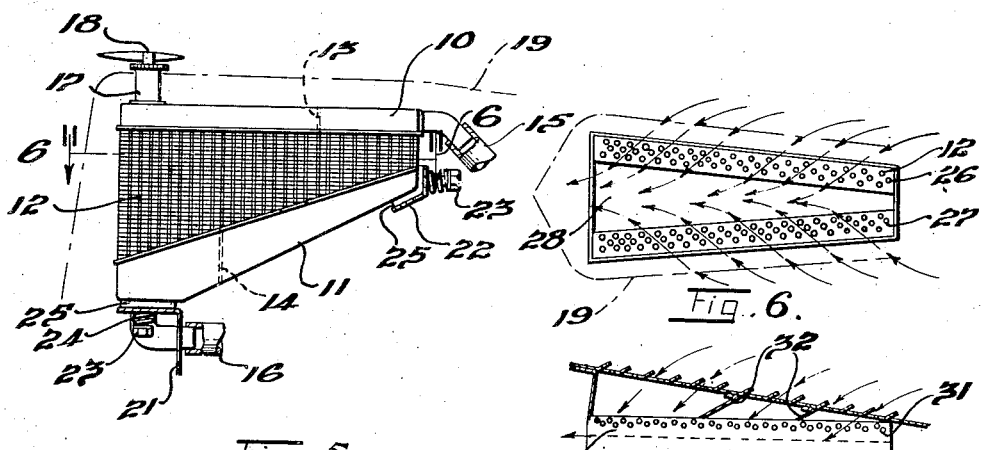
Fig. 5.
Fig. 6.
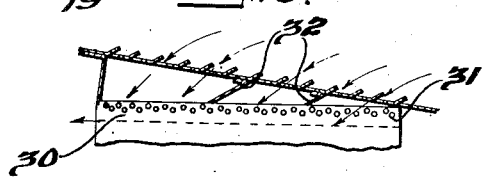
Fig. 7.
INVENTOR.
Sven Ingildsen,
BY
Dike, Calver & Gray
ATTORNEYS.

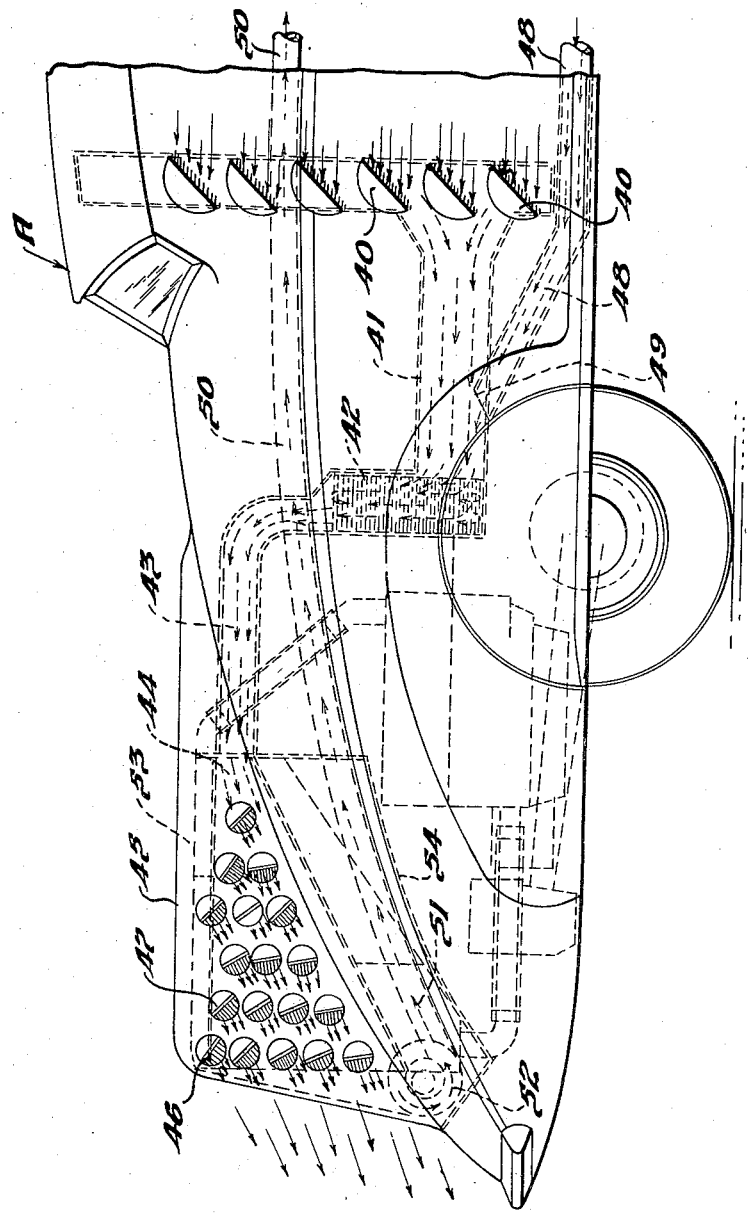

Patented Feb. 7, 1939

2,146,120

UNITED STATES PATENT OFFICE 2,146,120

AUTOMOBILE RADIATOR CONSTRUCTION

Sven Ingildsen, Detroit, Mich., assignor of one-half to O. L. Smith, Detroit, Mich.

Application April 20, 1936, Serial No. 75,278

11 Claims. (Cl. 180—68)

This invention relates to automobile radiator constructions and more particularly to such radiator constructions as are adapted for use in motor vehicles having rear-mounted engines.

In arranging radiators in motor vehicles, it has been found highly desirable to have the radiators installed at the engine end thereof, that is, to have both the engine and the radiator installed at the same end of the vehicle in order to eliminate long conduits in or under the body for carrying the cooling water from the engine end to the radiator end of the vehicle. Thus, in cases of rear engine motor vehicles, the necessity of arranging radiators in proximity to the rear end of the vehicle has been realized. However, such an arrangement of radiators in cars of the above type has serious disadvantages, one of them being the fact that by such an arrangement the radiator is removed from the region of direct and strong air flow and placed in the region where air flow is turbulent and a partial vacuum is in fact present, in consequence whereof the flow of cooling air into and through the radiator is irregular in character and insufficient in quantity.

Accordingly, it is one of the principal objects of the present invention to provide a novel radiator construction which can be installed at the rear end of a motor vehicle in a manner beneficial to the appearance thereof, and which can effect a sufficient cooling of the circulating heat-absorbing fluid of the engine. Particularly, it is one of the objects of the invention to effect such cooling of the circulating engine-cooling medium, using for such purpose the air flow available at the rear portion of the vehicle.

A further object of the invention is to provide a novel radiator adapted to be arranged at the rear end of a rear-engine driven motor vehicle, which radiator is designed to provide a sufficiently large cooling surface area without affecting adversely the appearance of the vehicle and without increasing appreciably the cross-sectional area of the body.

A still further object of the invention is to provide a novel radiator which can be conveniently arranged at the rear end of a rear-engine driven vehicle, which can be easily installed in the body, and which is readily accessible for inspection and repair.

A still further object of the invention is to provide a novel radiator which can be arranged at the rear of a rear-engine driven vehicle in such a way as to impart a pleasing and impressive contour which harmonizes with aero-dynamic body designs and provides at the rear of the vehicle body sufficient areas upon which to produce artistic designs such as ornamental louvers, grilles, caps and the like.

A still further object of the invention is to provide a novel radiator for motor vehicles, which is of high efficiency in utilizing the cooling effect of the air passing through the radiator cores, thereby permitting slower speeds of the air and water in the radiator, which may eliminate in many installations the necessity of providing air fans or water pumps, the use of which is imperative with less efficient radiator constructions.

It is a still further object of the invention to provide a novel radiator in which the discharge of the cooling air is directed into the region of the least pressure of air (partial vacuum) at the rear of the motor vehicle body, thus reducing the effect of rear end "drag" on the body.

It is also an important object of the invention to provide a radiator for rear-engine driven vehicles which is adapted to be installed on lines substantially parallel to the longitudinal axis of the vehicle, thereby acting as a stabilizing member, particularly at the higher speeds.

A still further object of the invention is to provide a radiator which may utilize cooling air drawn from the boundary layer formed at high speeds on the surfaces of the vehicle body, which air is discharged through the radiator cores and into the region of the partial vacuum created behind the moving vehicle, thus providing a construction in which air resistance to the movement of the vehicle is greatly decreased.

A still further object of the invention is to provide means whereby conduits in the body structure are provided to supply ventilation or heating of the interior of the body and act selectively as air-supply conduits to the radiator or as air discharge ducts leading therefrom.

Other objects and advantages of the invention will appear in the following description and appended claims, reference being had to the accompanying drawings forming a part of this specification, wherein two embodiments of the present invention are illustrated.

In the drawings, wherein like reference characters designate corresponding parts in the several views, Fig. 1 is a side view of the rear end of a rear-engine motor-driven vehicle, showing the radiator structure embodying the present invention installed therein.

Figure 1:
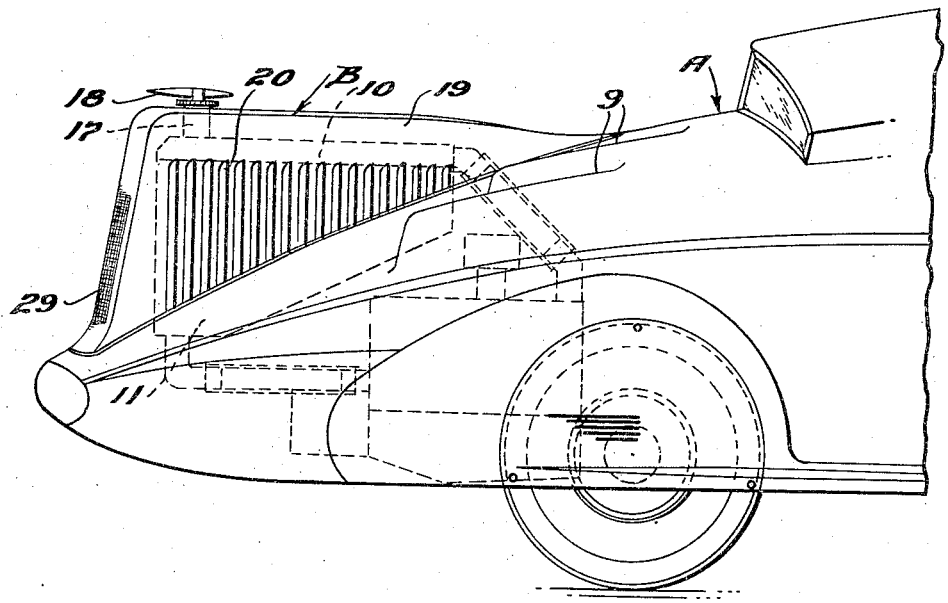
Figure 2:
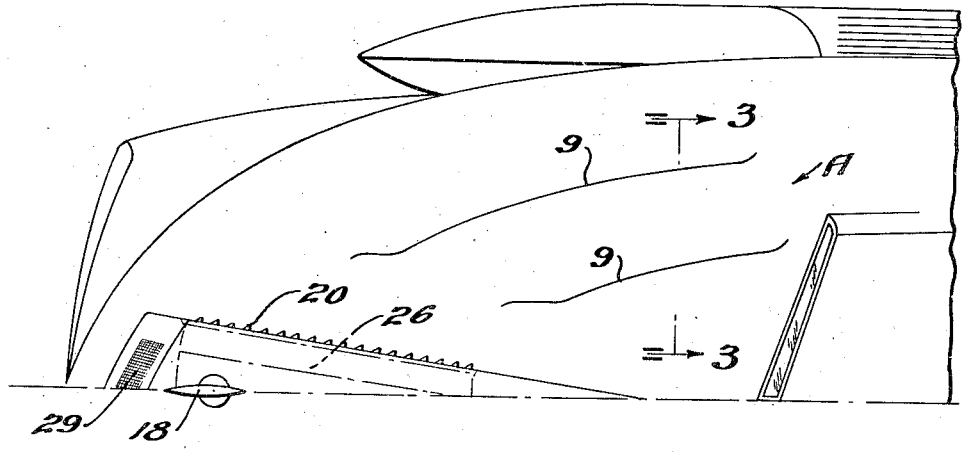
Fig. 2 is a top view of the structure of Fig. 1, showing only one of the two identical sides.

Fig. 3 is a rear view of the structure of Fig. 2 showing guiding vanes in section, the same being taken substantially on the line 3—3 of Fig. 2 in the direction of the arrows, the position of the radiator with respect to the body being indicated in dotted lines.

Fig. 4 is a rear view of the radiator, with the cover removed, showing the way in which the radiator is mounted with respect to the frame of an automobile.

Fig. 5 is a vertical sectional view of the structure of Fig. 4, taken substantially on the line 5—5 of Fig. 4 in the direction of the arrows.

Fig. 6 is a horizontal sectional view of the same structure, taken on the plane indicated by line 6—6 of Fig. 5.

Fig. 7 is a horizontal sectional view of the radiator construction with a modified arrangement of the core, namely using a single core, centrally located.

Fig. 8 is a side view of the rear portion of a rear-engine automobile having a modified radiator structure embodying the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation, and it is not intended to limit the invention claimed herein beyond the requirements of the prior art.

Referring to the drawings, A indicates generally a rear-engine motor vehicle with a radiator B embodying the invention installed at the rear end of the motor vehicle, partly within the contour of the body and partly extending rearwardly and upwardly therefrom as a vertical fin-like member. The radiator structure B comprises an upper water tank 10 and a lower water tank 11. Said tanks are connected internally by a series of tubes 12 which provide the cooling surfaces sufficient to effect cooling of the engine with the given amount of air and its speed in the radiator core. While I have shown a tubular type of radiator core, any other connecting means providing necessary cooling surfaces, such as the conventional honeycomb type of structure, may be used in the radiator embodying my invention.

Tanks 10 and 11 are provided with vertical transversely positioned partitions 13 and 14, respectively. The tank 10 is connected by means of a hot water conduit 15 with the upper part of the water jacket of the engine, while a cold water conduit 16 connects the tank 11 with the lower part of said water jacket. The radiator is filled with water or other cooling liquid through a filling extension 17 at the top of the tank 10, normally closed by an ornamental cap 18. A cover 19, suitably secured to the body structure and preferably hinged thereto, is so shaped as to cover the radiator while forming a continuation of the body surfaces. The two sides of the cover 19 are provided with a plurality of air-admitting openings or louvers, such as shown at 20, which openings are preferably executed in the form of louvers susceptible of receiving desired ornamentations. The louvers 20 communicate only with the inter-tube spaces of the radiator, and no flow of air under the radiator cover is possible except through the radiator tube cores.

The cover 19 provides an exposed surface which may be treated artistically as to its configuration and ornamentation, thus adding to the aesthetic appeal of the entire body design, enabling correction of the somewhat unusual appearance of the bodies used on rear-engine motor vehicles, due partly to the long and low extension of the body at the rear in which the engine is housed.

Fig. 4 illustrates the preferred method of mounting the radiator structure on the frame of the motor vehicle. Numerals 21 and 22 indicate frame members of an automobile to which the radiator is affixed, with a plurality of bolts or other securing means 23 attached to the bottom of the tank 11. Each of the bolts may be provided with a spring, such as shown at 24, to produce a flexible connection permitting a limited amount of relative movement between the radiator and the frame of the automobile. A number of rubber blocks, such as shown at 25, secured between the surfaces of the tank 11 and the car frame, provide a sound-deadening cushion which also prevent rattling and effect tight secure joints between the radiator and the vehicle frame.

In a preferred embodiment of the invention, the radiator tubes 12 are placed in two cores positioned at an angle with respect to each other, as shown in Fig. 6 and indicated by the numerals 26 and 27. In such a structure the air entering the louvers 20 passes through the cores 26 and 27 and into the space 28 formed by the angular arrangement of the cores, whereupon it is discharged through an opening or openings situated at a desired location in the car body rear end, such as through the grille 29 provided at the rear surface of the cover 19. In general, it is preferable to locate the discharge openings, such as the grille 29, at the surface adjacent the region of the greatest vacuum created behind the car body, which produces a suction effect at the louvers 20 which increases the flow of the cooling air into said louvers. Such an arrangement will cause a strong turbulent flow of air through the radiator structure and will utilize the partial vacuum behind the moving car. Thus, the radiator embodying my invention lends itself to the most efficient design for utilizing the fullest amount of engine power, since it utilizes the partial vacuum created behind the moving car for inducing a strong flow of the cooling air through the radiator structure, and constantly discharges such air within the region of partial vacuum, thereby reducing to a marked extent the rear end "drag".

Radiators of conventional design require special engine-driven power-absorbing fans to induce the air flow through the core. Such fans are eliminated in the construction previously described.

A modified form of the present invention utilizes a one-core construction, as shown in Fig. 7, wherein a single centrally-located core 30 is shown. In this construction, the discharge of the heated air is effected with the aid of a heated air space or conduit 31 located under the core 30 and leading to the discharge opening. Vertical partitions, such as shown at 32, are provided to secure a better distribution of air. Inasmuch as the heated air in this one-core structure is collected in a special conduit separated from the rest of the under-cover space, it may in many instances be very desirable to provide a special branch conduit with a small power-driven fan provided therein. By this construction, a desired quantity of heated air may be blown into the passenger compartment of the car body, thereby heating the same.

If it is necessary to have an exceptionally strong flow of air in the radiator, as may be the case in special cars with very large engines, the same may be provided by a plurality of air-directing members 9 situated opposite each of the two sides of the radiator and on the top surface of the rear extension of the body.

The flow of the cooling water for structures shown in Figs. 6 and 7 is as follows: Referring to Fig. 5, hot water from the engine jacket enters the tank 10 at 15 and contacts a partition 13 and is directed downwardly into the tank 11. A partition 14 in the tank 11 directs the water flow upwardly into the tank 10, from which it flows downwardly into the tank 11 and through the conduit 16 to the cold water intake of the engine water jacket. In passing through the tubes 12, a heat exchange occurs between the hot water and the air washing the outside surfaces of the tubes, and the heat of the water is carried away in the air stream.

In the novel radiator construction herein disclosed, the area of the cooling surface is relatively large and may be readily varied without requiring drastic body design changes, since the radiator can be made long enough to have cores having ample area of the cooling surfaces. This permits decreasing both the water and the air speeds, which, in turn, may permit elimination in many instances of both the water pump and the fan.

Fig. 8 illustrates a modified radiator structure embodying the present invention having the flow of the water in the radiator substantially similar to that of the preferred structure, while the flow of the cooling air is substantially a reverse of that of the preferred structure. Said modified structure includes also an engine-driven fan, which fan besides increasing the air flow in the radiator structure, operates to decrease still further the air resistance of the car body. In this structure the cooling air is sucked in from the side surfaces of the body at points adjacent its rear end. For this purpose a plurality of intake louvers, such as shown at 40, are provided at the side surfaces of the car body, as shown in Fig. 8. In some instances it may be advisable also to provide such louvers at the top surfaces of the body. A suitable vacuum or suction conduit 41 connects said intake louvers 40 with a fan or blower 42, which is, in turn, connected with the aid of a suitable pressure conduit 43 with the inter-tube spaces of the radiator. The radiator cover, indicated in this view by the numeral 45, is provided at its sides with a plurality of discharge louvers, such as shown at 46. The space under the radiator cover 45, which space is indicated by the numeral 53, is separated with the aid of a suitable partition 54 from the space in which the engine is housed. If desired, louvers 46 may be provided with discharge directing caps, such as shown at 47, for controlling the direction of discharged air, i. e. directing the air into the region of the greatest vacuum at the rear of the vehicle.

The suction conduit 41 may be connected with the aid of a suitable ventilation flue or duct 48 with the passenger compartment of the car. At its end connected to the suction conduit 41, said ventilation duct 48 is fitted with a draft-inducing cap or extension 49, while the end introduced into the passenger compartment is provided with a suitable screen or grille (not shown) with adjustably controlled openings adapted to be controlled from within the passenger compartment. The under-cover space 53 is connected by a suitable heating flue 50 with the passenger compartment of the car and heated air is driven through the flue 50 to the passenger compartment by a small power-driven fan 52 placed adjacent the radiator end 51 of the flue 50. In some instances it may be possible to dispense with said fan entirely, since during the operation of the ventilation flue a slight vacuum will be created in the passenger compartment, and the same, together with the slight pressure under which the heated air will be forced into the under-cover space 53, will insure sufficient difference of pressure in the under-cover space 53 and in the passenger compartment to produce a sufficient flow of the heated air into said passenger compartment.

In operation, the blower 42 is driven by the engine, preferably through a V-belt drive, and a partial vacuum is therefore created in the conduit 41. In consequence thereof, the air is sucked in through the intake louvers 40 and flows through the vacuum conduit 41 to the blower 42, by which it is forced through the pressure conduit 43 into the inter-core enclosure 44. The air is then forced through the radiator cores into the space under the radiator cover and from there through the discharge louvers 46 outside of the car structure and into the region of the greatest vacuum created in motion behind said car structure. Being forced through the cores, the air closely washes the water tubes and absorbs the heat imparted to the tube walls by the heated water. By sucking the air at the rear portions of the side and top surfaces of the car body, the parasitic boundary layer of air formed on high speeds at said surfaces is greatly reduced, if not entirely eliminated, whereby the air resistance of the car is greatly decreased. Parasitic boundary layers of air are usually formed at the surfaces of moving bodies due to the fluid friction of the air, and they are moving substantially with such moving bodies increasing the air-resisting cross-sectional area thereof, and consequently their air resistance. The detrimental effect of the boundary layer of air is particularly noticeable in cases of long streamline, or partially streamline bodies, such as rear-engine automobiles.

The air-resistance of the car is still further decreased by the discharge under pressure of the heated, and consequently greatly expanded air into the region of the greatest vacuum behind the car body. As may be readily appreciated from consideration of the above description of the modified structure, the presence of a vacuum conduit in the body structure enables utilizing the same for ventilating the passenger compartment without providing any other means than a suitable connecting conduit, such as done with the aid of the structure described above.

Thus, in one of its broader aspects, my invention contemplates providing a novel radiator structure for rear-engine automobiles which structure is adapted to be installed in an automobile of the above type vertically and along the longitudinal axis thereof, thereby enabling an increase in the area of the cooling surface of an automobile radiator without increasing the cross-sectional area of the automobile, while improving the appearance thereof; and which further assists in decreasing the vacuum behind the car and in removing the boundary layer of air formed at the vehicle body surfaces. The construction also enables the heating and ventilation of the passenger compartment of the vehicle by simply providing suitable connecting conduits with adjustably controlled discharge openings within the vehicle body.

While there have been illustrated and described only two embodiments of the invention, it is to be expressly understood that the invention is not limited thereto, but may be embodied in various forms. Numerous changes and modifications in the forms and relative arrangements of parts, which will now appear to those skilled in the art, may be made without departing from the scope of the invention. Reference is, therefore, to be had to the appended claims for a definition of the limits of the invention.

I claim:

1. A rear-engine motor vehicle having a radiator arranged at the rear thereof in a fin-like member extending in a vertical plane substantially parallel to the longitudinal axis of said motor vehicle.

2. A rear-engine motor vehicle having a radiator arranged at the rear thereof in a fin-like member extending in a vertical plane substantially parallel to the longitudinal axis of said motor vehicle and having air-washed core surfaces lying in planes extending at an angle of less than 90° to the longitudinal axis of the motor vehicle.

3. A rear-engine motor vehicle having a radiator arranged in a vertical fin-like member located at the upper surface of the engine compartment, said fin-like member extending on lines substantially parallel to the longitudinal axis of said motor vehicle.

4. A rear-engine motor vehicle having a radiator arranged in a vertical fin-like member located at the upper surface of the engine compartment, said fin-like member extending on lines substantially parallel to the longitudinal axis of said motor vehicle, and having a series of air intake openings adapted to deflect a stream of cooling air to the radiator core surfaces, and air-discharge openings adapted to discharge air flowing over said core into a region of diminished air pressure created rearwardly of said vehicle when in motion.

5. In combination with a rear-engine motor vehicle, a radiator arranged in a vertical fin-like extension substantially parallel to the longitudinal axis of the motor vehicle and located at the upper surface of the engine compartment, said radiator comprising an upper water tank and a lower water tank, connected to the upper and to the lower portions of the engine water jacket, respectively; a plurality of water tubes connecting said tanks and arranged in two vertical cores placed at an angle with respect to each other, a plurality of air-receiving openings provided at the side surfaces of said fin-like extension for directing the cooling air into the inter-tube spaces of said cores; and a plurality of discharge openings situated at surfaces substantially perpendicular to the longitudinal axis of the motor vehicle, and adapted to direct the discharge of the air from the inter-tube spaces of said cores into a region rearwardly of said vehicle.

6. In a rear-engine motor vehicle, a radiator arranged at the engine end thereof in a fin-like position above the engine compartment and in a plane substantially parallel to the longitudinal axis of the motor vehicle, a conduit having a blower operatively arranged therein for drawing air from the surfaces of the automobile body and directing such air to the radiator cores and through discharge openings communicating therewith, said discharge openings being arranged to direct the air discharge toward the rear of the vehicle and proximate to a region of diminished air pressure created by the vehicle in motion.

7. A heating system for motor vehicles having a rear-mounted engine therein and comprising a heat-exchanging member lying in a fin outside the body of the vehicle and connected with the engine to receive a circulating heated fluid medium therefrom, air ducts communicating with said member, one system of ducts arranged to supply air to said member and another system of ducts arranged to discharge heated air forwardly into the passenger compartment of the vehicle.

8. A heating system for motor vehicles having a rear-mounted engine therein and comprising a heat-exchanging member lying in a fin outside the body of the vehicle and connected with the engine to receive a circulating heated fluid medium therefrom, air ducts communicating with said member, one system of ducts arranged to supply air to said member and another system of ducts arranged to discharge heated air forwardly into the passenger compartment of the vehicle, and means inside the passenger compartment for regulating the supply of heated air thereto.

9. In combination with a motor vehicle, a radiator secured adjacent the engine end thereof on a line substantially parallel to the longitudinal axis of said vehicle, said radiator comprising an upper water tank and a lower water tank, operatively connected to the upper and to the lower portions of the engine jacket, respectively; a plurality of substantially vertical transverse partitions in said tanks; and a plurality of water tubes connecting said upper and lower tanks, said tubes adapted to be washed from outside by the cooling air flowing through the radiator structure and adapted to have cooling fluid circulating within their confines, said partition causing the cooling fluid to flow repeatedly from the upper tank into the lower tank and from the lower tank into the upper tank in order to increase the amount of heat given up by the cooling fluid.

10. A rear engine motor vehicle having a radiator arranged at the rear thereof in a fin-like member extending in a vertical plane substantially parallel to the longitudinal axis of said vehicle, said radiator comprising spaced tanks, one tank connected with the fluid discharge of the engine jacket to receive heated fluid therefrom, another tank connected with the fluid intake of the engine jacket to supply cooled fluid thereto, a plurality of air-washed hollow members connected to said tanks, and baffle members interposed in said tanks to reverse the direction of flow of fluid through the tanks and connected hollow members.

11. In combination with a rear engine motor vehicle, a radiator arranged adjacent the engine at the rear of said vehicle in a vertical plane substantially parallel to the longitudinal axis of the vehicle, and extending partly inside and partly outside of the external contour of the vehicle, said radiator having a core positioned therein and adapted to be washed substantially throughout its entire length by a flow of cooling air from the air masses flowing adjacent the outside of the body structure of said vehicle.

SVEN INGILDSEN.